(12) United States Patent
Budhia et al.

(10) Patent No.: US 8,249,067 B2
(45) Date of Patent: Aug. 21, 2012

(54) SEPARATION OF FABRIC AND PACKET PROCESSING SOURCE IN A SYSTEM

(75) Inventors: Rupa Budhia, San Jose, CA (US); Venkateshwar Buduma, San Jose, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 126 days.

(21) Appl. No.: 12/201,931

(22) Filed: Aug. 29, 2008

(65) Prior Publication Data

US 2009/0213868 A1    Aug. 27, 2009

Related U.S. Application Data

(60) Provisional application No. 61/031,808, filed on Feb. 27, 2008.

(51) Int. Cl.
*H04L 12/28* (2006.01)

(52) U.S. Cl. ........................................ 370/389; 370/419

(58) Field of Classification Search ........................ None
See application file for complete search history.

(56) References Cited

U.S. PATENT DOCUMENTS

| | | | |
|---|---|---|---|
| 2002/0143855 A1* | 10/2002 | Traversat et al. | 709/202 |
| 2004/0066799 A1* | 4/2004 | Li et al. | 370/474 |
| 2005/0100011 A1* | 5/2005 | Chiruvolu et al. | 370/389 |
| 2005/0169311 A1* | 8/2005 | Millet et al. | 370/471 |
| 2006/0253606 A1* | 11/2006 | Okuno | 709/238 |

* cited by examiner

*Primary Examiner* — Otis L Thompson, Jr.
(74) *Attorney, Agent, or Firm* — Brake Hughes Bellermann LLP (57) ABSTRACT

An apparatus may include a port interface that is arranged and configured to receive a packet from an ingress port, a traffic management module being operatively coupled to the port interface and that is arranged and configured to manage routing of the packet to a destination, and a packet processing engine that is arranged and configured to perform packet processing on the packet and to associate a tag with the packet, where the tag includes a packet processing source field, a destination field, and a fabric source field.

17 Claims, 5 Drawing Sheets

| 506a | | |
|---|---|---|
| 312 (A,1) | 314 (A,1) | 316 (C,1) |

FIG. 5A

| 506b | | |
|---|---|---|
| 312 (A,1) | 314 (C,1) | 316 (B,2) |

FIG. 5B

| 506c | | |
|---|---|---|
| 312 (A,1) | 314 (B,2) | 316 (D,3) |

SEPARATION OF FABRIC AND PACKET PROCESSING SOURCE IN A SYSTEM

CROSS REFERENCE TO RELATED APPLICATIONS

This application claims the benefit of U.S. Provisional Application No. 61/031,808, filed Feb. 27, 2008, and titled "Packet Processing In a System", which is hereby incorporated by reference in its entirety.

TECHNICAL FIELD

This description relates to the separation of fabric and packet processing source in a system.

BACKGROUND

A device, such as a switch or a router, may include one or more devices that channel incoming packets from any of multiple input ports to an output port appropriate for the packet's destination. For example, a network switch may be configured to inspect a packet as it is received, determine the source and destination device of the packet and forward the packet appropriately.

Typically, a local area network (LAN) and a wide-area-network (WAN) may include a number of linked switches. Whereas, often Small Office, Home Office (SOHO) applications may make use of a single switch or an all-purpose converged device (e.g., a gateway or a router).

In some instance, a network switch may be incorporated into a single integrated circuit (IC). In this context, such a device may be referred to as a switch-on-a-chip (SOC). Multiple SOCs may be used together to form a larger switching system. In many instances, such a switching system may be packaged, sold, and thought of as a single switch. Often, such a switch may allow for the insertion of additional SOCs (e.g., using plug-in cards) to increase the capacity of the packaged switch.

SUMMARY

The details of one or more implementations are set forth in the accompanying drawings and the description below. Other features will be apparent from the description and drawings, and from the claims.

DETAILED DESCRIPTION

When a packet enters a system, the packet may be tagged with a packet processing source that identifies a point at which the packet entered the system. A packet may refer to a bundle of data, usually in binary form, that may be organized in a specific way for transmission. The system may be a collection of one or more devices including packet processing devices. The system may be configured to function as a network device such as, for example, a router, a network switch, a gateway, or other type of network device that performs packet processing. The system may additionally be configured to perform other functions as well. The packet processing source may be used by the system for the functions of fabric forwarding, Layer 2 learning and source port knockout.

In order for a packet to undergo packet processing at more than one device in the system, the packet needs to be forwarded properly from hop to hop. This may mean that the most recent device that processed the packet be the source for the packet. This may be called a fabric source, meaning a most recent packet processing device that processed the packet. However, it is also important to keep track of the packet processing source, meaning the point where the packet first entered the system. As mentioned above, the packet processing source may be used by the egress device for the functions of fabric forwarding, Layer 2 learning and source port knockout. Typical conventional devices and systems may not have been able to track both the packet processing source and the fabric source as the packet traversed through a system of packet processing devices.

Figure 1:
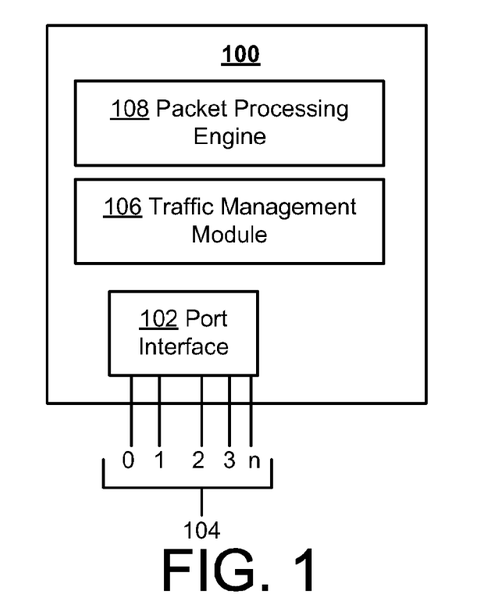
FIG. 1 is an exemplary block diagram of a device.

Referring to FIG. 1, a packet processing device 100 is illustrated. The packet processing device 100 may include a port interface 102 that is arranged and configured to interface with one or more ports 104. The ports 104 are illustrated as ports 0, 1, 2, 3, and n, with port n representing any number of additional ports. The ports are a point in the device where packets enter and exit the device. When the packet processing device 100 is incorporated into a system of devices, then the ports 104 may be an ingress and egress to the system and to other devices.

The packet processing device 100 also may include a traffic management module 106. The traffic management module 106 may be arranged and configured to manage the routing of packets in and out of the packet processing device 100. The traffic management module 106 may be operatively coupled to the port interface 102, such that the flow of packets proceeds from the ports 104 to the port interface 102 and to the traffic management module 106. The traffic management module 106 may process the packet to determine if the packet is to be processed by the packet processing device 100 and to manage the next destination of the packet. In this manner, the traffic management module 106 operates to ensure the packet is properly routed to its next destination. In some situations, the flow of packets may proceed from the ports 104 to the port interface 102 and then to other components in the packet processing device 100 prior to flowing to the traffic management module 106. In other situations, the flow of packets may proceed from the ports 104 to the port interface 102 and then to the traffic management module 106 and other components of the packet processing device 100 simultaneously.

The packet processing device 100 also may include a packet processing engine 108. The packet processing engine 108 may be arranged and configured to perform packet processing on the packet. In one exemplary implementation, the processing may include checking a set or series of rules (e.g., an Access Control List (ACL)) to determine what further processing to perform on the data within the packet. Other processing also may be performed. For example, voice data may be processed for quality of service (QoS) concerns, whereas video data or data marked as secret may be processed for digital rights management (DRM) or encryption.

The packet processing engine 108 also may perform other processing of the packet and data including, for example:

Packet Forwarding, Policing, Learning, Virtual Local Area Network (VLAN) Tag Actions, Quality of Service (QoS) Marking, Ingress Mirroring, Copy to Central Processing Unit (CPU), Internet Protocol Flow Information Export (IPFIX) and various Counters; however, it is understood that the above are merely a few illustrative examples to which the disclosed subject matter is not limited.

Still other processing that may be performed by the packet processing engine 108 includes: Incoming Layer-3 Determination, Forwarding Decisions, Packet Modifications, Tunnel Decapsulation, Policer Selection, Policer State Update, Packet State Update, Internal Field Processor (IFP) Lookup, Apply IFP Actions, VLAN Tag Actions, VLAN Tag determination, QoS marking, Ingress Mirror Determination, Ingress Mirror packet copying, CPU Copying Determination, CPU Copy packet copying, IPFIX Flow Identification, IPFIX Flow State Update, Counter Selection, and Counter Update; however, it is understood that the above are merely a few illustrative examples to which the disclosed subject matter is not limited.

The packet processing engine 108 also may be configured to associate a tag with the packet, where the tag may include one or more fields. The tag fields may include a packet processing source field, a destination field, and a fabric source field. The use of the tag enables valuable information to be saved as a packet transits through a system of packet processing and other devices.

The tag may be used solely as an internal tag that is not visible or used by external sources. Thus, the packet processing engine 108 may be configured to append the tag to the packet as it first enters a system of packet processing devices. The packet processing engine 108 also may be configured to edit and reconfigure the tag. The packet processing engine 108 also may be configured to remove the tag from the packet prior to the packet exiting the system.

Figure 2A:
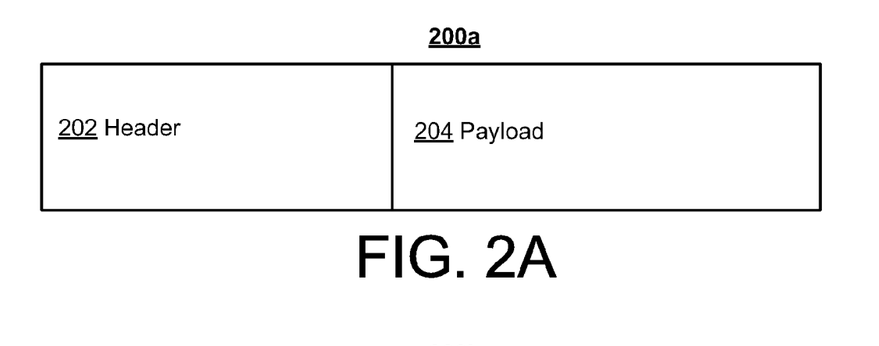
FIGS. 2A and 2B are exemplary block diagrams of a packet.

Referring also to FIG. 2A, a packet 200a is illustrated. A packet 200a may include a header portion 202 and a payload portion 204. The header portion 202 may include control information for the packet such as, for example, synchronizing bits, address of the destination or target device, address of the originating device, length of packet, and other packet control type information. The address of the destination device and the address of the originating device may refer to devices that are external devices, meaning external to any system that includes a packet processing device such as packet processing device 100. The address for the system itself may be an address of the destination device or an address of the originating device, if the system, which includes packet processing device 100, is the destination for the packet or the originating source for the packet, as the case may be.

The payload portion 204 may include the data that is being or to be transmitted. The packet 200a also may include one or more other portions (not shown) such as, for example, a trailer portion, which may indicate the end of the packet and include error detection and correction bits.

The packet 200a may represents a packet prior to a tag being added to the packet by the packet processing engine 108. Thus, once the packet 200a is received at one of the ports 104, the port interface 102 may communicate the packet 200a to the traffic management module 106 and/or to the packet processing engine 108. As discussed above, the packet processing engine 108 may be configured to add the tag to the packet 200a.

Figure 2B:
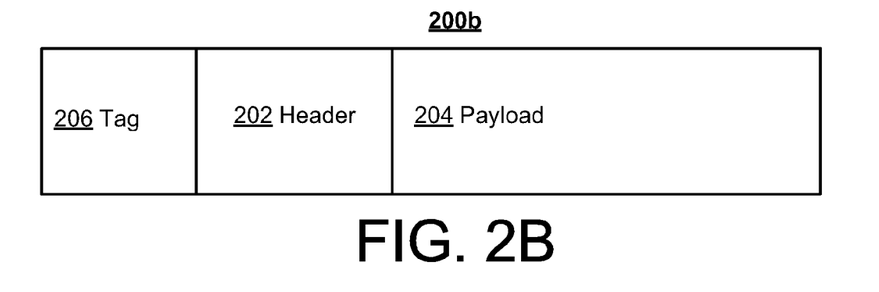

Referring also to FIG. 2B, a packet 200b is illustrated. The packet 200b may represent a packet that includes a tag 206. The tag 206 may be appending to the existing header portion 202 and the payload portion 204. The tag 206 may be configurable and may be of any length. The length of the tag 206 may depend, in part, on the type of processing function that may be performed the packet processing device 100 and any other packet processing devices, which may be arranged together to form a system.

The tag 206 also may be editable meaning that the packet processing engine 108 may edit the one or more fields that comprise the tag 206. The packet processing engine 108 also may be configured to add and/or delete fields within the tag 206.

Figure 3:
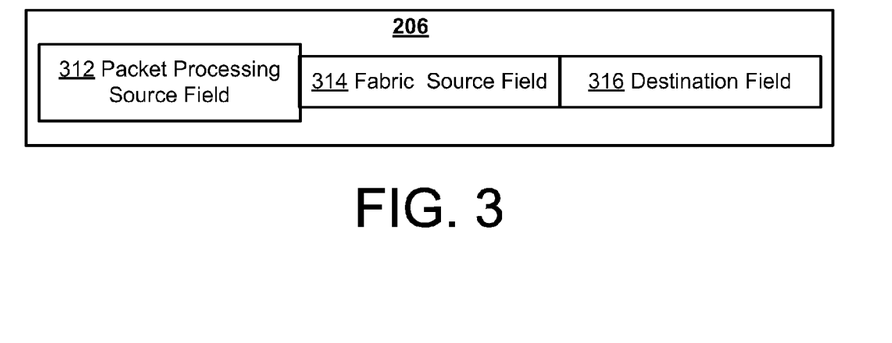
FIG. 3 is an exemplary block diagram of a tag.

Referring also to FIG. 3, the tag 206 is illustrated in more detail. The tag 206 may include one or more fields. The one or more fields may include a packet processing source field 312, a fabric source field 314 and a destination field 316. Other fields may be added to the tag 206 by the packet processing engine 108 of the packet processing device 100 or by another packet processing engine that may be a component in another packet processing device.

The packet processing source field 312 may be used to store a value for a packet processing source. The packet processing source may represent an entry point to a system. In one exemplary implementation, the packet processing source may identify a port and a packet processing device that first received the packet when the packet entered the system. For example, the packet 200b was first received on packet processing device 100, port 1 (104), then the packet processing engine 108 would insert an identifier for packet processing device 100, port 1 in the packet processing source field 312 of the tag 206.

The packet processing source that is inserted by the packet processing engine 108 may remain static in the packet processing source field 312 as the packet 200b is communicated within a system of packet processing devices. Keeping the packet processing source fixed as the packet is processed by multiple packet processing devices enables the devices, including an egress packet processing device, to use the packet processing source to perform various functions. The egress packet processing device may be the last packet processing device to process the packet 206b before the packet 206b exits a system.

In one exemplary implementation, the egress packet processing device may use the packet processing source from the packet processing source field 312 to perform layer 2 learning and source port knockout. Keeping the packet processing source fixed as the packet traverses a system of packet processing devices enables the packet to have multiple hops in the system while still retaining the packet processing source.

The fabric source field 314 may be used to store a value for a fabric source. The fabric source may represent an identifier for the most recent packet processing device to process that packet. For example, when the packet 206b is processed by the packet processing device 100, then the packet processing engine 108 inserts an identifier for the packet processing device and its appropriate port in the fabric source field 314 of the tag 206.

The fabric source that is inserted by the packet processing engine 108 may be edited and changed in the fabric source field 314 as the packet 200b is communicated within a system of packet processing devices. Thus, if another packet processing device receives and processes the packet, then the packet processing engine in that packet processing device would replace the fabric source in the fabric source field 314 with an identifier representing that packet processing device and its appropriate port. As the packet 206b hops to different packet processing devices within a system, then the packet processing device that most recently processed the packet may be identified as the fabric source in the fabric source field 314.

Since the tag 206 includes both a packet processing source and a fabric source, the packet processing devices have information about where the packet first entered the system, including port ingress information, and which packet processing device originated the packet in the current hop.

The destination field 316 may be used to store a value for a destination. The destination may represent an identifier for a next packet processing device to which the packet may be sent. The destination may be an internal destination meaning that it is destined for another packet processing device that is part of a same system.

Figure 4:
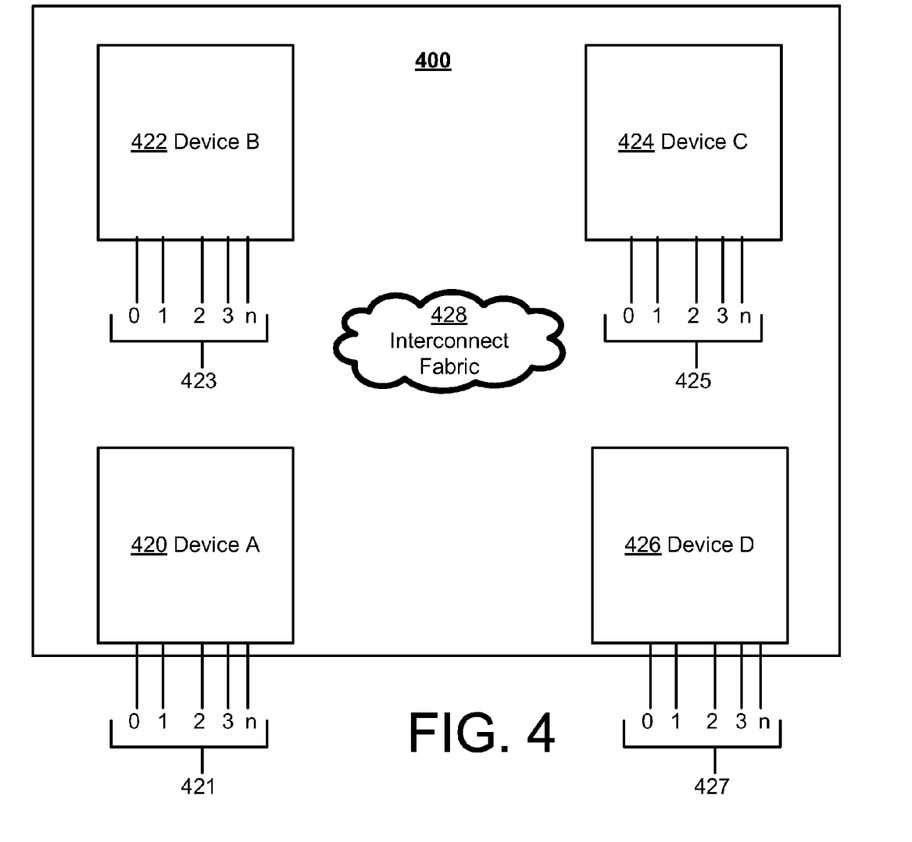
FIG. 4 is an exemplary block diagram of a system including devices of FIG. 1.

Referring to FIG. 4, a system 400 is illustrated. System 400 includes multiple packet processing devices such as, for example, packet processing devices 420 (labeled "Device A"), 422 (labeled "Device B"), 424 (labeled "Device C") and 426 (labeled "Device D"). The packet processing devices 420, 422, 424 and 426 may be arranged and configured to include the same components that function in the same way as the packet processing device 100, as described in FIG. 1. The packet processing devices 420, 422, 424, and 426 also may perform one or more of the packet processing functions described above with respect to FIG. 1. In one exemplary implementation, each of the packet processing devices 420, 422, 424, and 426 may be an IC that is configured as a SOC.

Each of the packet processing devices 420, 422, 424, and 426 may have one or more ports 421, 423, 425, and 427, respectively. The ports 421, 423, 425 and 427 may be configured similar to the ports 104 of FIG. 1. The ports 421, 423, 425 and 427 may be external ports with access outside of system 400 and/or internal ports just providing access among the devices in system 400.

System 400 may be configured to be a network device such as, for example, a switch, a router, a bridge, a gateway or any type of device that may include multiple packet processing devices. System 400 also may include an interconnect fabric 428.

The interconnect fabric 428 may arranged and configured to provide interconnects between the packet processing devices 420, 422, 424, and 426. In one exemplary implementation, the interconnect fabric 428 may include hardware, software, firmware, or a combination thereof, that moves packets from one packet processing device to another within a system (e.g., system 400).

The packet processing devices 420, 422, 424, and 426 may be configured and arranged in various different fabric topologies. For example, the packet processing devices 420, 422, 424 and 426 may be arranged in a star topology, a ring topology, or other type of topology. The system 400 may or may not include the interconnect fabric 428, depending on a type of fabric topology that has been implemented. For example, in a ring topology, the interconnect fabric may not be necessary.

The use of the tag (e.g., tag 206 of FIG. 2B) by the packet processing devices 420, 422, 424, and 426 provides for the separation of the packet processing source and the fabric source. This separation of the different sources enables the packets to be communicated to multiple different devices within the system 400. The packets also may be communicated to multiple different devices independent of the type of fabric topology because of the use of the tag, which operates to separately track the packet processing source and the fabric source.

The use of the tag (e.g., tag 206 of FIG. 2B) by the packet processing devices 420, 422, 424, and 426 also enables a packet to be a multi-task packet. A multi-task packet means that the packet may be sent to more than one packet processing device at the same time for packet processing. If necessary, the packet processing engines within the packet processing devices may add additional fields, as may be needed, to track and keep the fabric sources separate.

Figure 5A:
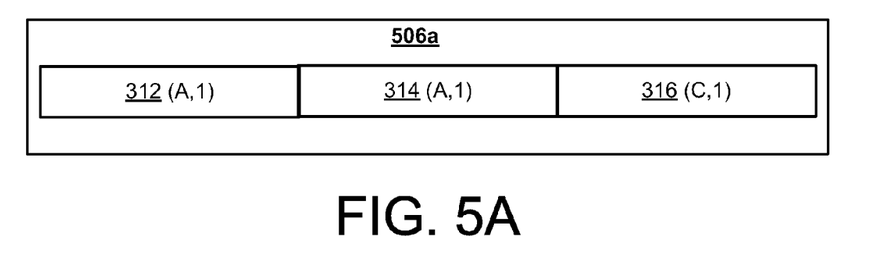
FIGS. 5A-5C are exemplary block diagrams of a tag.

Referring also to FIG. 5A, a tag 506a is illustrated. The tag 506a is a tag having the same features at the tag 206 of FIG. 2B. Thus, tag 506a includes a packet processing source field 312, a fabric source field 314 and a destination field 316.

In one exemplary implementation, a packet may enter system 400 at port 1 (421) of Device A 420. When Device A 420 receives the packet, the packet processing engine of Device A 420 appends tag 506a to the packet. The packet processing engine also inserts the packet processing source (A,1) into the packet processing source field 312, where the A represents Device A and the 1 represents port 1. In this manner, the packet processing source represents that the packet first entered system 400 at port 1 of Device A 420. This information stays with the packet as it may be communicated to other devices within system 400. Keeping track of the packet processing source may be important for layer 2 proxy processing because it is not desirable to send the packet out of system 400 through the same device and port at which it entered system 400.

The packet processing engine also inserts the fabric source (A,1) into the fabric source field 314 and a destination, for example, (C,1), in the destination field 316. The fabric source represents to the next destination in the system 400 that port 1 of Device A 420 is the most recent device in the system 400 to handle the packet. The packet processing engine of Device A 420 may perform packet processing on the packet and then communicate the packet to its next destination.

Figure 5B:
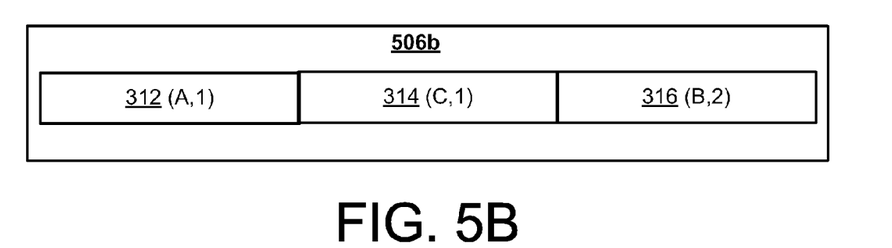

The packet then may be sent, using the interconnect fabric 428, to the next destination of port 1 of Device C 424, as specified in the destination field 316. The tag 506a portion of the packet now may be modified by the packet processing engine of Device C 424. Referring now to FIG. 5B, the tag 506b, as modified by Device C 424, is illustrated. The packet processing source field 312 is not modified, but remains the same. The fabric source field 314 is edited to reflect that port 1 of Device C is now the fabric source (C,1). The destination field 316 also may be edited to replace the destination with the next destination. For example, the next destination may be port 2 of Device B 422. As such, (B,2) may be inserted into the destination field 316. The packet processing engine of Device C 424 may perform packet processing on the packet and then communicate the packet to its next destination.

Figure 5C:
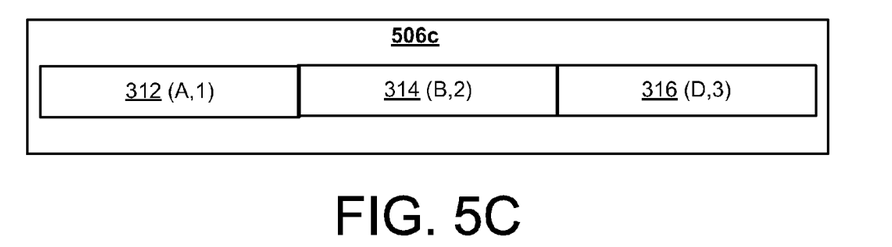

The packet then may be sent, using the interconnect fabric 428, to the next destination of port 2 of Device B 422, as specified in the destination field 316. The tag 506b portion of the packet now may be modified by the packet processing engine of Device B 422. Referring now to FIG. 5C, the tag 506c, as modified by Device B 422, is illustrated. The packet processing source field 312 is not modified, but remains the same. The fabric source field 314 is edited to reflect that port 2 of Device B is now the fabric source (B,2). The destination field 316 also may be edited to replace the destination with the next destination. For example, the next destination may be port 3 of Device D 426. As such, (D,3) may be inserted into the destination field 316. The packet processing engine of Device B 422 may perform packet processing on the packet and then communicate the packet to its next destination.

In this exemplary implementation, Device D 426 may be the egress device meaning that the packet processing engine of Device D 426 may perform some packet processing and then communicate the packet out of the system 400 to an external destination. In the above example illustrated with FIGS. 5A-5C, the identifiers illustrated are examples and it is recognized that other types of identifiers may be used for the packet processing source, the fabric source and the destination.

Figure 6:
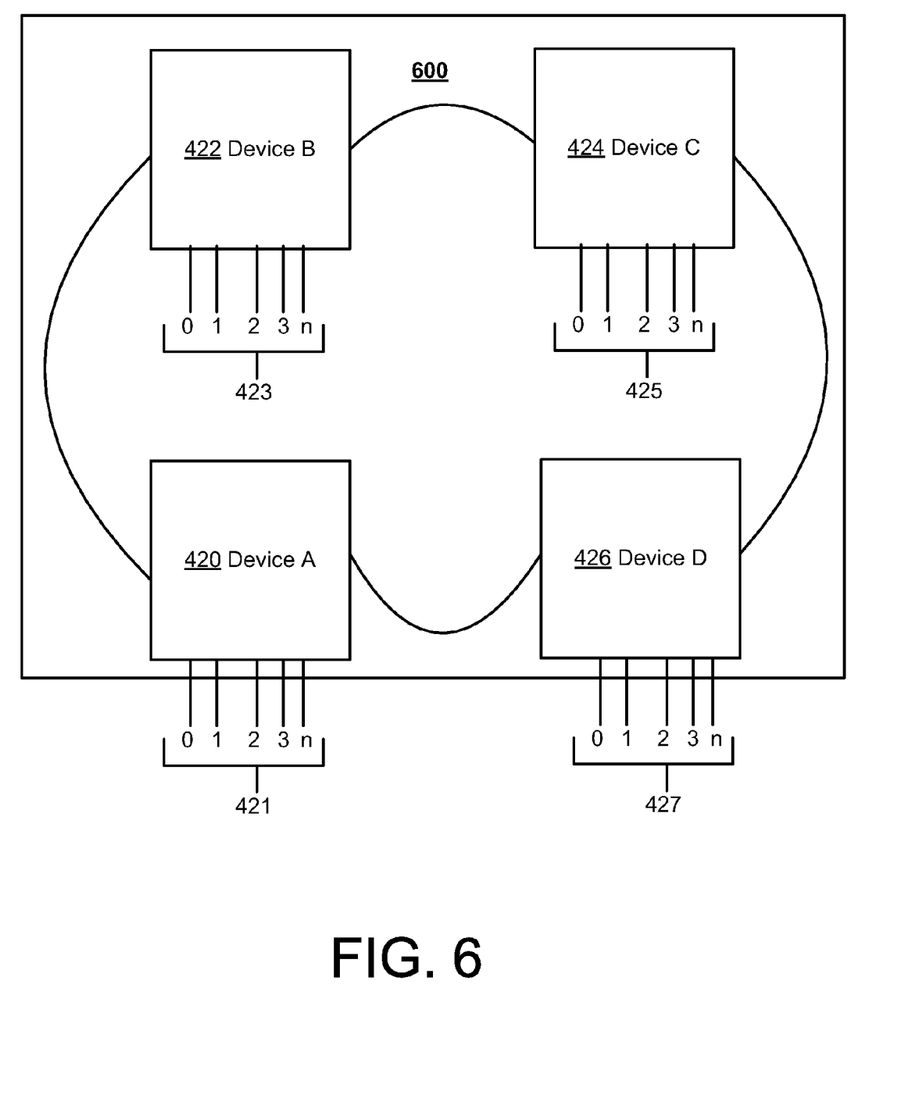
FIG. 6 is an exemplary block diagram of a system including devices of FIG. 1.

Referring to FIG. 6, a system 600 is illustrated. System 600 may be configured to be a network device such as, for example, a switch, a router, a bridge, a gateway or any type of device that may include multiple packet processing devices. System 600 includes packet processing devices 420, 422, 424, and 426. In this example, system 600 does not include an interconnect fabric.

System 600 illustrates an example of the packet processing devices 420, 422, 424 and 426 arranged and configured in a ring topology. The ring topology may include imposed packet flow rules that may be based, at least in part, on the packet processing source and/or the fabric source. The fabric source may be used to implement packet flow rules around the system 600. The packet processing source may be used by each of the packet processing devices 420, 422, 424 and 426 to perform any packet processing such as, for example, L2 learning and source port knockout. For example, if the fabric source is not tracked as the packet traverses the system 600, then it is possible for a packet to get stuck in a loop in the ring topology. The use of a tag (e.g., tag 206 of FIG. 2B) enables imposed flow rules to function properly without packets getting stuck in an endless loop in the ring topology because the tag enables the fabric source to be tracked as the packet traverses through the system.

Figure 7:
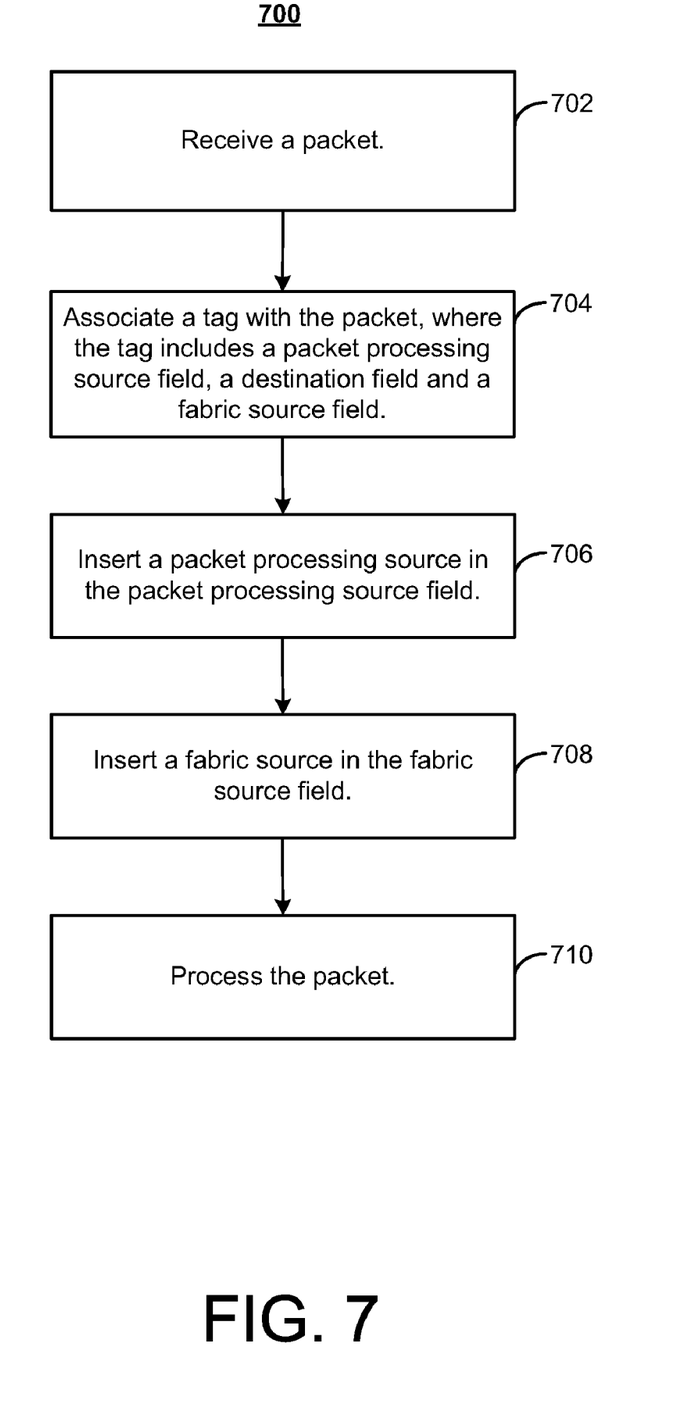
FIG. 7 is an exemplary flowchart illustrating example operations of the device of FIG. 1.

Referring to FIG. 7, a process 700 is illustrated. Process 700 may include receiving a packet (702). For example, the packet processing device 100 of FIG. 1 may be configured to receive a packet at one of its ports 104 (702).

Process 700 also may include associating a tag with the packet, where the tag includes a packet processing source field, a destination field and a fabric source field (704). For instance, the packet processing engine 108 of FIG. 1 may be configured to associate a tag with the packet (704). As discussed above with respect to FIGS. 2 and 3, a tag 206 may include a packet processing source field 312, a fabric source field 314 and a destination field 316.

Process 700 also may include inserting a packet processing source in the packet processing source field, where the packet processing source identifies an entry point to a system (706). For example, the packet processing engine 108 of FIG. 1 may be configured to insert a packet processing source in the packet processing field (706). It may be that some amount of packet processing may occur before a packet processing source is determined.

Process 700 also may include inserting a fabric source in the fabric source field, where the fabric source identifies a most recent device to process the packet in the system (708). For example, the packet processing engine 108 of FIG. 1 may be configured to insert a fabric source in the fabric source field (708).

Process 700 also may include processing the packet (710). For example, the packet processing engine 108 of FIG. 1 may be configured to process the packet (710).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. An apparatus, comprising:
 a port interface that is arranged and configured to receive a packet from an ingress port;
 a traffic management module being operatively coupled to the port interface and that is arranged and configured to manage routing of the packet to a destination; and
 a packet processing engine that is arranged and configured to:
  perform packet processing on the packet,
  associate a tag with the packet, wherein the tag includes a packet processing source field to identify an entry point to a fabric, a destination field, and a fabric source field to identify a most recent device to process the packet in the fabric,
  enable forwarding of the packet through multiple hops within the fabric when devices other than an ingress device process the packet,
  edit the tag by changing the fabric source field to identify the most recent device to process the packet in the fabric, wherein the packet processing source field remains fixed within the fabric,
  enable the packet to be processed independent of a fabric topology using the tag, and
  enable layer 2 learning, source port knockout and layer 2 proxy processing using the packet processing source field and the fabric source field.

2. The apparatus of claim 1 wherein the port interface is arranged and configured to communicate the packet to an egress port.

3. The apparatus of claim 1 wherein the packet processing engine is further arranged and configured to insert a packet processing source in the packet processing source field.

4. The apparatus of claim 1 wherein the packet processing engine is further arranged and configured to insert a destination in the destination field based on the packet processing performed at the packet processing engine.

5. The apparatus of claim 1 wherein the packet processing engine is further arranged and configured to insert a fabric source into the fabric source field, wherein the fabric source represents an identifier for the apparatus.

6. The apparatus of claim 1 wherein a device other than the ingress device functions as a proxy device.

7. A system, comprising:
 a first packet processing device that is arranged and configured to:
  receive a packet as the packet enters the system,
  associate a tag with the packet, wherein the tag includes a packet processing source field, a destination field, and a fabric source field, and
  insert a packet processing source into the packet processing source field, wherein the packet processing source identifies a port and the first packet processing device as an entry point to the system; and
 a second packet processing device that is arranged and configured to:
  receive the packet from the first packet processing device,
  process the packet,
  edit the tag by changing a fabric source in the fabric source field, wherein the fabric source identifies the second packet processing device as a most recent processing device in the system and enables forwarding of the packet through multiple hops within the system when devices other than the first packet processing device process the packet and the packet processing source field remains fixed within the fabric,
  enable the packet to be processed independent of a fabric topology using the tag, and
  enable Layer 2 learning, source port knockout and Layer 2 proxy processing using the packet processing source field and the fabric source field.

8. The system of claim 7 further comprising an interconnect fabric that is arranged and configured to provide interconnects between the first packet processing device and the second packet processing device.

9. The system of claim 7 wherein the first packet processing device and the second packet processing device are arranged in a ring topology.

10. The system of claim 7 wherein:
 the first packet processing device and the second packet processing device are arranged in a ring topology; and
 the fabric source field in the tag enables the packet to traverse the ring topology multiple times without being in an endless loop.

11. The system of claim 10 wherein the packet processing source field enables the first packet processing device and the second packet processing device to perform packet processing functions as the packet traverses the ring topology.

12. The system of claim 7 wherein the tag enables the packet to be processed by the first packet processing device and the second packet processing device.

13. The system of claim 7 wherein the second packet processing device is a proxy device.

14. The system of claim 7 further comprising multiple other packet processing devices that are arranged and configured to:
 receive the packet;
 process the packet; and
 edit the tag by changing the fabric source in the fabric source field.

15. A method, comprising:
 receiving a packet;
 associating a tag with the packet, wherein the tag includes a packet processing source field, a destination field, and a fabric source field;
 inserting a packet processing source in the packet processing source field, wherein the packet processing source identifies an entry point to a fabric;
 inserting a fabric source in the fabric source field, wherein the fabric source identifies a most recent device to process the packet in the fabric and enables forwarding of the packet through multiple hops within the fabric when devices other than an ingress device process the packet;
 editing the tag by changing the fabric source field to identify the most recent device to process the packet in the fabric, wherein the packet processing source field remains fixed within the fabric;
 enabling the packet to be processed independent of a fabric topology using the tag; and
 enabling Layer 2 learning, source port knockout and Layer 2 proxy processing using the packet processing source field and the fabric source field.

16. The method as in claim 15 wherein processing the packet includes sending the packet to a device within a fabric topology and editing the tag associated with the packet, wherein the packet processing source field remains fixed.

17. The method as in claim 15 wherein a device other than the ingress device functions as a proxy device.

* * * * *

UNITED STATES PATENT AND TRADEMARK OFFICE
CERTIFICATE OF CORRECTION

| | |
|---|---|
| PATENT NO. | : 8,249,067 B2 |
| APPLICATION NO. | : 12/201931 |
| DATED | : August 21, 2012 |
| INVENTOR(S) | : Rupa Budhia et al. |

Page 1 of 1

It is certified that error appears in the above-identified patent and that said Letters Patent is hereby corrected as shown below:

In column 9, line 26, in Claim 1, delete "layer" and insert -- Layer --, therefor.

In column 9, line 26, in Claim 1, delete "layer" and insert -- Layer --, therefor.

Signed and Sealed this
Twenty-second Day of January, 2013

David J. Kappos
*Director of the United States Patent and Trademark Office*